(12) United States Patent
Tomm et al.

(10) Patent No.: US 6,560,608 B1
(45) Date of Patent: May 6, 2003

(54) METHOD AND APPARATUS FOR AUTOMATICALLY SELECTING A RULE

(75) Inventors: Douglas Cameron Tomm, Milpitas, CA (US); Donald Albert Leckie, Merrimack, NH (US)

(73) Assignee: Contivo, Inc., Mountain View, CA (US)

( * ) Notice: Subject to any disclaimer, the term of this patent is extended or adjusted under 35 U.S.C. 154(b) by 286 days.

(21) Appl. No.: 09/590,916

(22) Filed: Jun. 9, 2000

(51) Int. Cl.[7] .............................................. G06F 17/30
(52) U.S. Cl. ...................... 707/102; 707/201
(58) Field of Search .................. 707/102, 201

(56) References Cited

U.S. PATENT DOCUMENTS

| | | | | |
|---|---|---|---|---|
| 4,610,025 A | * | 9/1986 | Blum et al. ..................... 380/1 |
| 4,965,763 A | * | 10/1990 | Zamora ......................... 704/1 |
| 5,027,316 A | * | 6/1991 | Franbtz et al. ................. 710/11 |
| 5,257,369 A | * | 10/1993 | Skeen et al. ................. 709/312 |
| 5,283,856 A | * | 2/1994 | Gross et al. .................. 706/45 |
| 5,497,319 A | * | 3/1996 | Chong et al. .................. 704/10 |
| 5,704,060 A | * | 12/1997 | Del Monte ..................... 704/7 |
| 5,724,593 A | * | 3/1998 | Hargrave et al. ............... 704/7 |
| 5,754,938 A | * | 5/1998 | Herz et al. ..................... 705/74 |
| 5,799,310 A | * | 8/1998 | Anderson et al. ........... 707/102 |
| 5,822,527 A | * | 10/1998 | Post ........................... 709/316 |
| 5,987,440 A | * | 11/1999 | O'Neil et al. ................. 705/39 |
| 6,167,445 A | * | 12/2000 | Gai et al. .................... 709/220 |
| 6,272,495 B1 | * | 8/2001 | Hetherington ............... 707/101 |
| 6,292,811 B1 | * | 9/2001 | Clancey et al. .............. 715/503 |
| 6,347,374 B1 | * | 2/2002 | Drake et al. ................. 713/200 |
| 6,360,010 B1 | * | 3/2002 | Hu et al. ..................... 358/464 |
| 6,374,270 B1 | * | 4/2002 | Maimon et al. ............... 704/2 |
| 6,424,358 B1 | * | 7/2002 | DiDomizio et al. ........ 345/762 |

* cited by examiner

*Primary Examiner*—Wayne Amsbury
(74) *Attorney, Agent, or Firm*—Blakely, Sokoloff, Taylor & Zafman LLP

(57) ABSTRACT

A method and apparatus for automatically selecting a rule during the mapping process, and storing the rule independently of message type, is provided. The method and apparatus allow these rules to be inferred during the mapping process, and to be manipulated easily by a user.

21 Claims, 7 Drawing Sheets

SYNONYM
DICTIONARY 335

CONCEPT 410         SYNONYM FIELDS 420

NAME   415          {EDI.NAME, XML.REQUISITION} 425

COUNT  417          {EDI.QUANTITY, XML.NUMBER} 427

FIG. 4

METHOD AND APPARATUS FOR AUTOMATICALLY SELECTING A RULE

FIELD OF INVENTION

This invention is related generally to processing data with computers, and in particular to converting data from one format to another.

BACKGROUND OF THE INVENTION

Two organizations that wish to conduct business with one another electronically find they can send electronic messages to each other, but that the messages are in different formats. The messages sent by a company to one of its suppliers will not be understood unless a mechanism is in place to translate the message from the company's format to the supplier's format. The set of rules for doing such a translation is called a map.

Traditionally, maps had to be developed manually by human experts such as business analysts by documenting the field names of the messages. Traditional Software tools can also do mappings, however, the field names must be identical in order for the traditional software tools to work.

These tools are deficient in the degree of automation with which the maps may be produced. Two message format-types that are being mapped may have a complex relationship that requires a sophisticated conversion procedure or calculation. Such a conversion procedure is called a rule.

However, using traditional mapping methods, a human operator must intervene in the mapping process to enter the rules manually. It is in the specification of rules that current software tools are found wanting. If the same kind of conversion has to be done in different maps, or several times within the same map, the same rule has to be manually entered each time.

It is desirable to have a system that allows these rules to be more easily manipulated. It is further desirable to copy the procedures, eliminating the error-prone and tiresome process of entering the procedure manually each time it is needed. Furthermore, a need exists to store a procedure in a persistent storage system such as a database, and retrieve it automatically. Finally, the procedures should be available to the mapping mechanism, and retrievable in such a way as to require minimal intervention from a human operator.

SUMMARY OF THE INVENTION

A method and apparatus for automatically selecting a rule during the mapping process, and storing the rule independently of message type, is provided. The method and apparatus allow these rules to be inferred during the mapping process, and to be manipulated easily by a user.

BRIEF DESCRIPTION OF THE DRAWINGS

The present invention is illustrated by way of example and not limitation in the figures of the accompanying drawings, in which like references indicate similar elements, and in which:

FIG. 4 is an example of a synonym dictionary.

DETAILED DESCRIPTION

These and other embodiments of the present invention may be realized in accordance with the following teachings and it should be evident that various modifications and changes may be made in the following teachings without departing from the broader spirit and scope of the invention. The specification and drawings are, accordingly, to be regarded in an illustrative rather than restrictive sense and the invention measured only in terms of the claims.

Hardware Overview

According to the present invention, a host computer system transmits and receives data over a computer network or standard telephone line. According to one embodiment, the steps of accessing, downloading, and manipulating the data, as well as other aspects of the present invention are implemented by a central processing unit (CPU) in the host computer executing sequences of instructions stored in a memory. The memory may be a random access memory (RAM), read-only memory (ROM), a persistent store, such as a mass storage device, or any combination of these devices. Execution of the sequences of instructions causes the CPU to perform steps according to the present invention.

The instructions may be loaded into the memory of the host computer from a storage device, or from one or more other computer systems over a network connection. For example, a server computer may transmit a sequence of instructions to the host computer in response to a message transmitted to the server over a network by the host. As the host receives the instructions over the network connection, it stores the instructions in memory. The host may store the instructions for later execution or execute the instructions as they arrive over the network connection. In some cases, the downloaded instructions may be directly supported by the CPU. In other cases, the instructions may not be directly executable by the CPU, and may instead be executed by an interpreter that interprets the instructions. In other embodiments, hardwired circuitry may be used in place of, or in combination with, software instructions to implement the present invention. Thus, the present invention is not limited to any specific combination of hardware circuitry and software, nor to any particular source for the instructions executed by the host computer.

Figure 1:
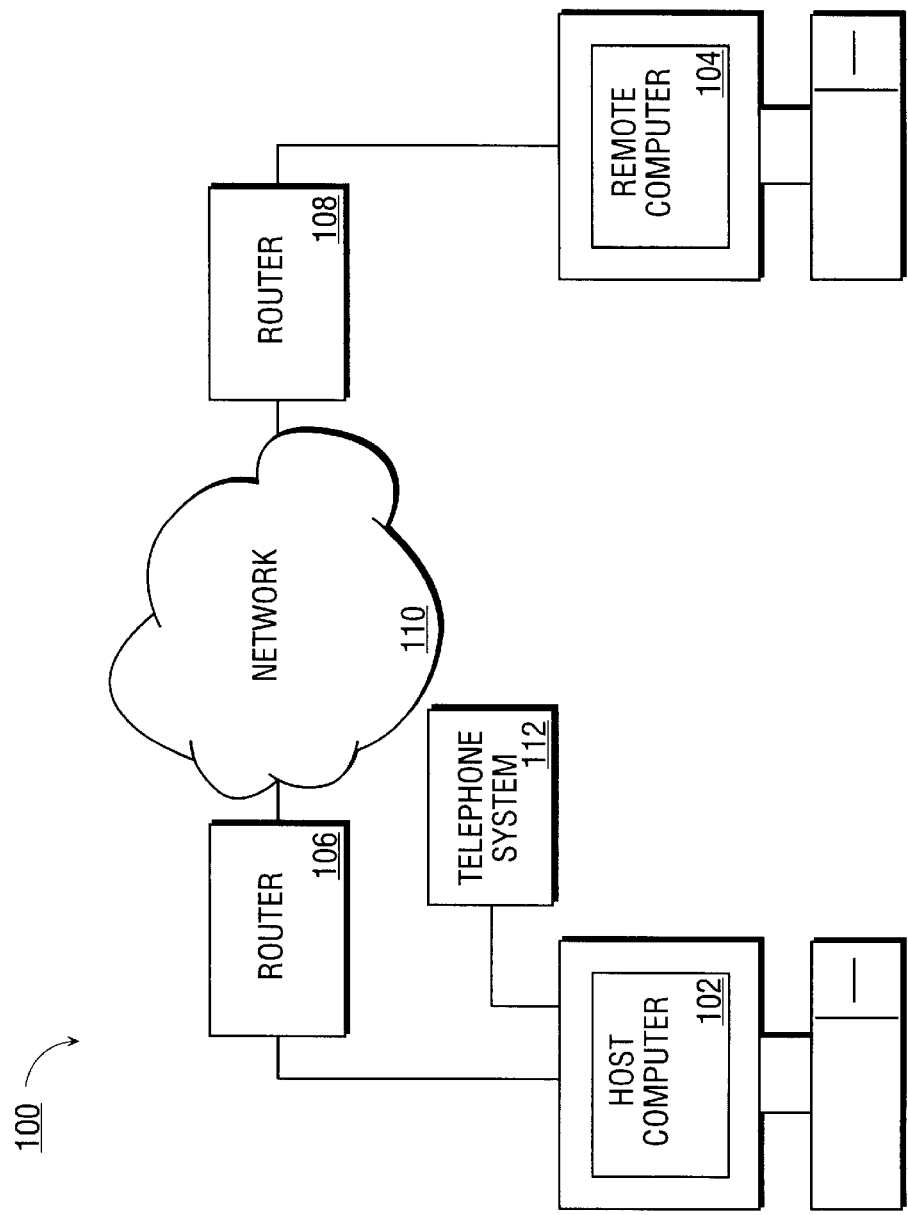
FIG. 1 illustrates host and remote computers connected over a network.

FIG. 1 illustrates a system 100 in which a host computer 102 is connected to a remote computer 104 through a network 110. The network interface between host computer 102 and remote 104 may also include one or more routers, such as routers 106 and 108, which serve to buffer and route the data transmitted between the host and client computers. Network 110 may be the Internet, a Wide Area Network (WAN), a Local Area Network (LAN), or any combination thereof. The remote computer 104 may be a World-Wide Web (WWW) server that stores data in the form of 'web pages' and transmits these pages as Hypertext Markup Language (HTML) files over the Internet network 110 to host computer 102. To access these files, host computer 102 runs a 'web browser', which is simply an application program for accessing and providing links to web pages available on various Internet sites. Host computer 102 is also configured to communicate to telephone system 112 through a telephone interface, typically a modem.

Figure 2:
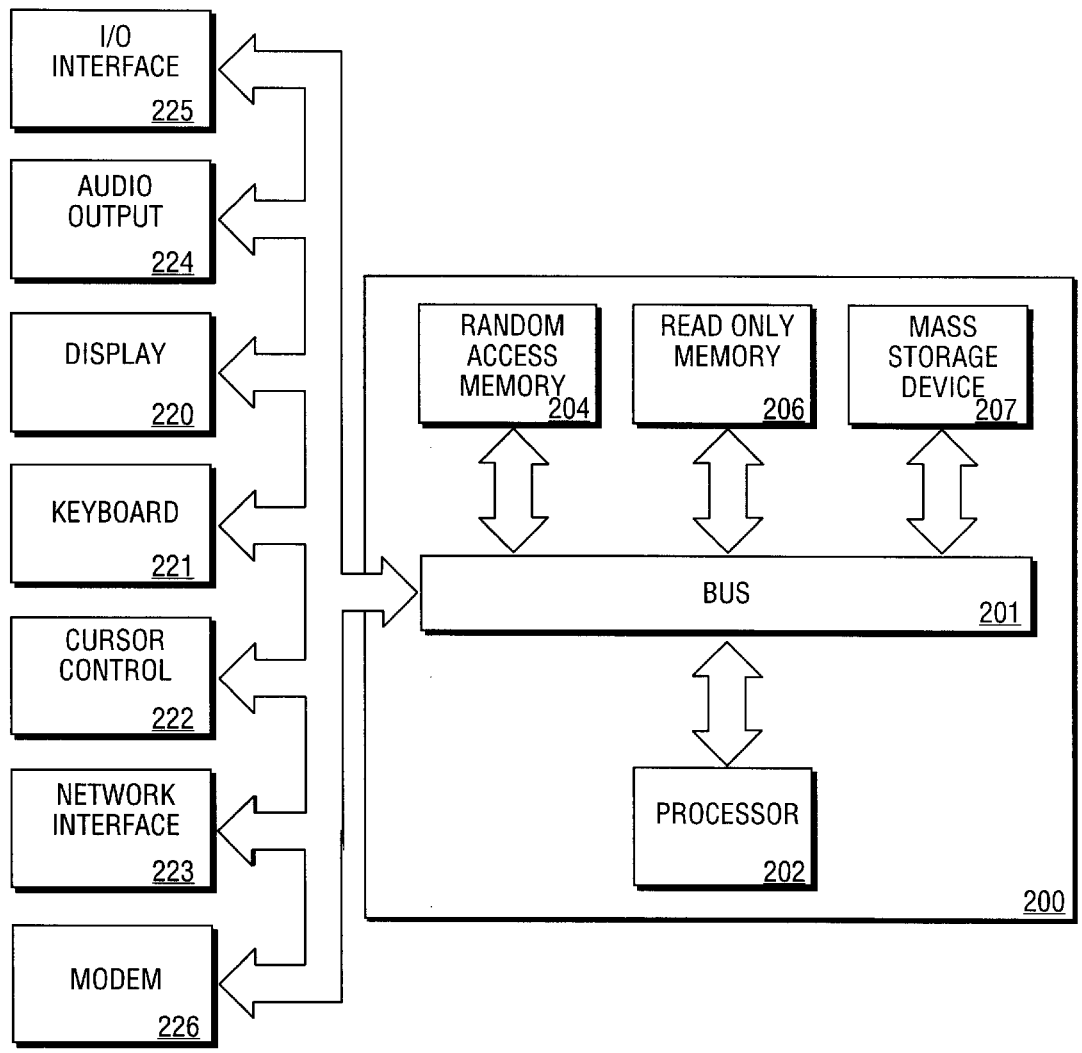
FIG. 2 is a block diagram of a host computer system which may be used to implement an embodiment of the present invention.

FIG. 2 is a block diagram of a representative networked computer, such as host computer 102 illustrated in FIG. 1. The computer system 200 includes a processor 202 coupled through a bus 201 to a random access memory (RAM) 204, a read only memory (ROM) 206, and a mass storage device 207. Mass storage device 207 could be a disk or tape drive for storing data and instructions. A display device 220 for providing visual output is also coupled to processor 202 through bus 201. Keyboard 221 is coupled to bus 201 for communicating information and command selections to processor 202. Another type of user input device is cursor control unit 222, which may be a device such as a mouse or trackball, for communicating direction commands that control cursor movement on display 220. Also coupled to processor 202 through bus 201 is an audio output port 224 for connection to speakers that output audio signals produced by computer 200.

Further coupled to processor 202 through bus 201 is an input/output (I/O) interface 225, and a network interface device 223 for providing a physical and logical connection between computer system 200 and a network. Network interface device 223 is used by various communication applications running on computer 200 for communicating over a network medium and may represent devices such as an ethernet card, ISDN card, or similar devices.

Modem 226 interfaces computer system 200 to a telephone line and translates digital data produced by the computer into analog signals that can be transmitted over standard telephone lines, such as by telephone system 112 in FIG. 1. In an embodiment of the present invention, modem 226 provides a hardwired interface to a telephone wall jack, however modem 226 could also represent a wireless modem for communication over cellular telephone networks. It should be noted that the architecture of FIG. 2 is provided only for purposes of illustration, and that a host computer used in conjunction with the present invention is not limited to the specific architecture shown.

The network and computer systems shown in FIGS. 1 and 2 are used by the present invention to automatically convert the format of a first message into the format of a second message. Messages are composed of discrete data elements called fields. A map is a recipe that describes how the fields of one message (the source) are transformed into the fields of another (the target). Different message formats have many abstract concepts in common, even though they may represent these abstractions in different ways. For example, dates and postal addresses are commonly represented in a variety of message formats, where the representation of each format may be different. One advantage of the present invention is to extract these common notions from various message formats. Another advantage of the present invention is providing a database of these common traits, which are called concepts.

Each field in each format is described in a database. The fields are grouped into sets in the database, where each set corresponds to a concept. The database itself is called the synonym dictionary. The set contains every field from all business objects where the corresponding concept is represented. For example, the concept BIRTH_DATE will have a set that contains every field that represents a birth date, from all business objects or business formats. The set of field names associated with the corresponding concept is called the synonym set.

The synonym dictionary is used to create a translation map. The translation map is used by a translation engine to convert, or translate a message from a first format, such as a source format, to a second format, such as a target format.

Figure 3:
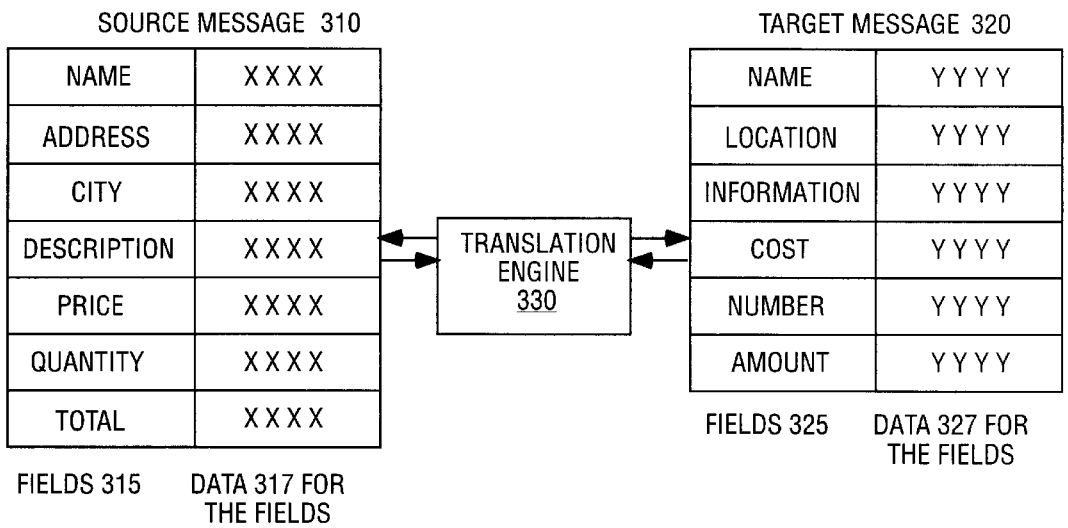
FIG. 3 is an example of a translation for two different message formats.

FIG. 3 shows an example of the fields of two different message formats, a source message format 310 and a target message format 320. In this embodiment, the message is a purchase order, for example. However, the message may convey any information that one person or business wants to send to another person or business. The source fields 325 are name, address, city, description, price, quantity, and total. The target fields 315 are name, location, information, cost, number, and amount. Although the formats of the source and target fields are structurally different, they have similarities and common abstractions such as name, amount, and place to ship the goods. Thus, the names of the fields 315 and 325 may be different, such as "price" and "cost," for example, but the data 317 and 327 contained in these fields is the same.

A synonym dictionary assigns an abstract meaning to the different names of similar fields, and captures this abstract meaning in a set of fields called a concept. Structurally, the synonym dictionary has a list of concepts 410, as shown in FIG. 4. A set of synonym fields 420 is associated with each concept. For example, the concept NAME 415 has a corresponding set of synonyms 425. Each synonym field corresponds to a data field for a given format. For example, the synonym field 425 contains the data fields EDI, NAME, and XML, REQUISITIONER. Thus, the concept can be mapped onto EDI field "NAME" or XML Field "REQUISITIONER." All fields of business objects (e.g., formats or forms), can be associated with corresponding concepts and synonyms. The business objects can be any kind of business document, such as an order form, a time sheet, or any other type of business form.

After the synonym dictionary is created, it can be used to map each field in one message to a corresponding field in another message. For example, given one target field in the target message, a synonym dictionary is searched for the synonym set in which that field appears. The synonym dictionary guarantees that there is exactly one set that contains the target field. Next, the method iterates over every field in the source message, examining the set of synonyms associated with the source field. If the sets with the source and target fields have at least one common synonym, the source and target fields are said to be mapped.

Figure 5:
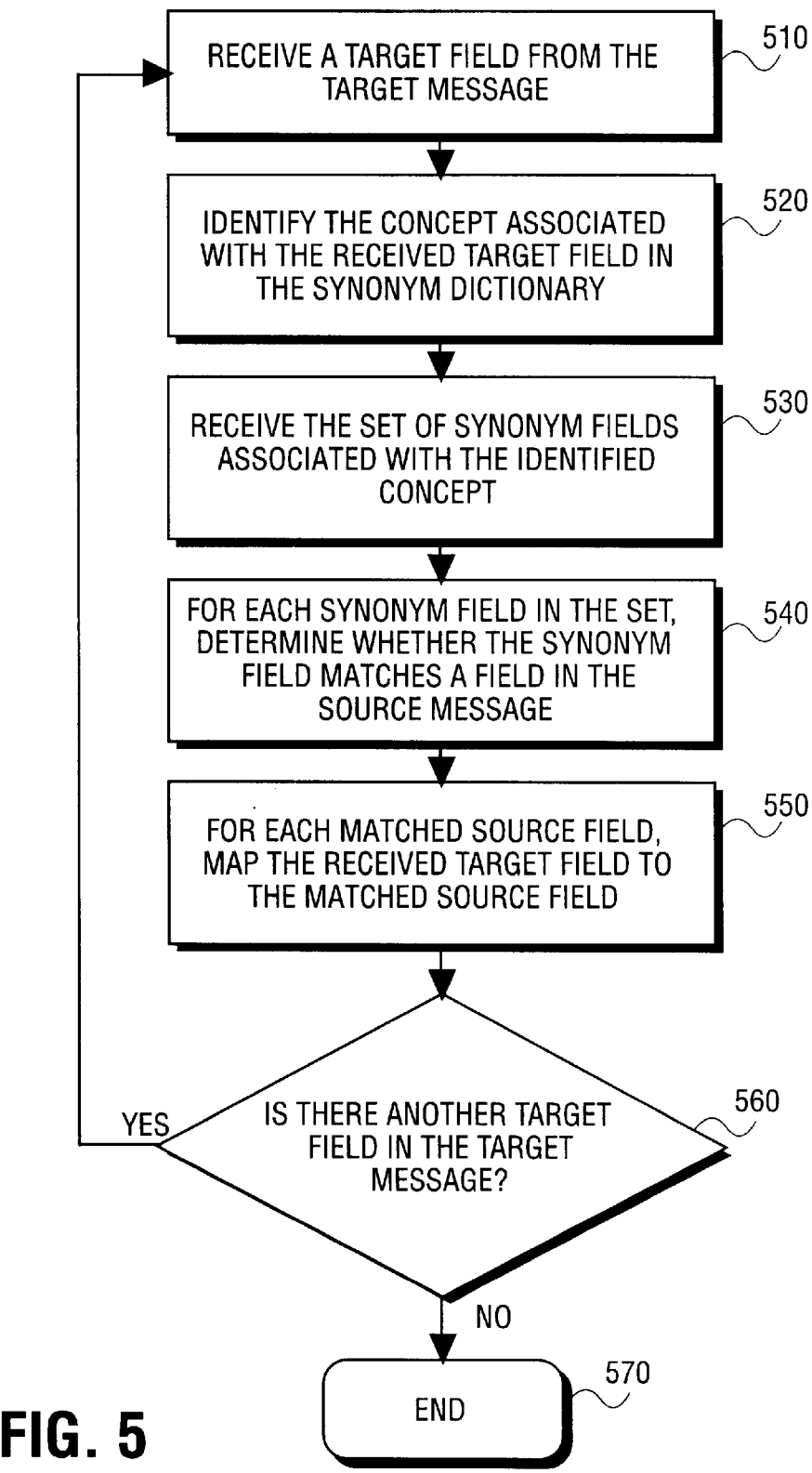
FIG. 5 is a flow diagram of a method for translating from a first format to a second format.

An example of a method for performing an auto-mapping process is shown in FIG. 5. The method shown in FIG. 5 uses the synonym dictionary to convert, or translate, a message from a source format to a target format. A target field in the target message is received, step 510. The concept for the received target field is identified in the synonym dictionary, step 520. The set of synonym fields associated with the identified concept are received, step 530. The method then identifies a field in the synonym set that matches a source field in the source message, step 540. The matched source field is then mapped to the received target field, step 550. The method repeats step for each field in the synonym set. Then, the method is repeated for each field in the target message, step 560.

The method is applied once for each field in the target. The method is applied to each field in the target message type, and works backwards, deriving one or more fields in the source that map to the target.

The method shown in FIG. 5 provides several advantages over the prior art. For example, suppose a user desires to produce two maps, one between message format-types A and B, and another between message format-types A and C. The prior approach requires the user to either create the map between A and C by hand, or to delete the logical associations that have been established for A and B, and create new ones between A and C. Both of these steps require actions to be taken by a user.

In contrast, the method described herein permits logical associations between all of A, B, and C, and allows a user to automatically generate maps between any pair of message format-types without the human intervention steps. This method is far superior to attempting textual matches, because it will not produce wrong associations, and has a much higher success rate in locating matches.

A rule is a procedure that produces a single output from one or more inputs. The output and each of the inputs have a specific data type. The number and type of the inputs, and the type of the output, are the rule's signature. A rule also has a name and a short description, but the rule engine is structured to refer to a rule by its signature. The method determines what rule is to be applied when two fields are to be mapped, and inserts the proper rule into the map.

Figure 6:
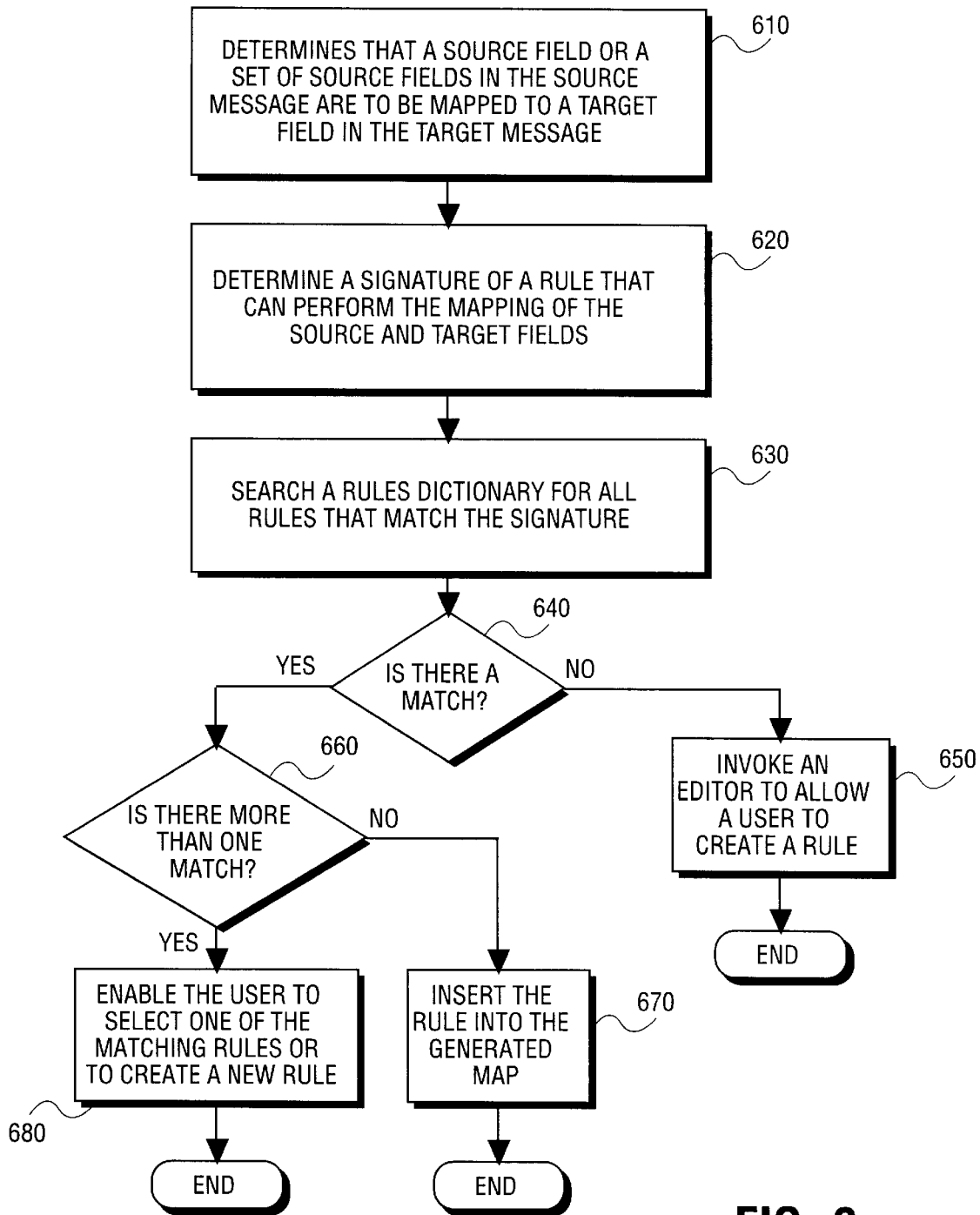
FIG. 6 is a flow diagram of a method for automatically selecting a rule used to convert one or more fields from a first format to a second format.

The method of selecting mapping rule is shown in FIG. 6. The method begins at the point in the auto-mapping process when it has been determined that a field, or set of fields, in a source message are to be mapped to a field in the target message, step 610. From the source and target fields, the method determines the signature of the rule that can perform the data conversions needed to map the source and target fields, step 620. Once the signature is determined, the rules dictionary is searched for any rules that match that signature, step 630. If no rule matches, step 640, an editor that allows the user to create a suitable rule is invoked, step 650. If there is more than one match, the user interface presents the user with a list of rules that match, step 660, showing the names and descriptions of the matching rules. The user may select a rule from this list or create a new one with the rule editor, step 680. If there is exactly one match, the matching rule is inserted into the generated map, step 670.

Figure 7:
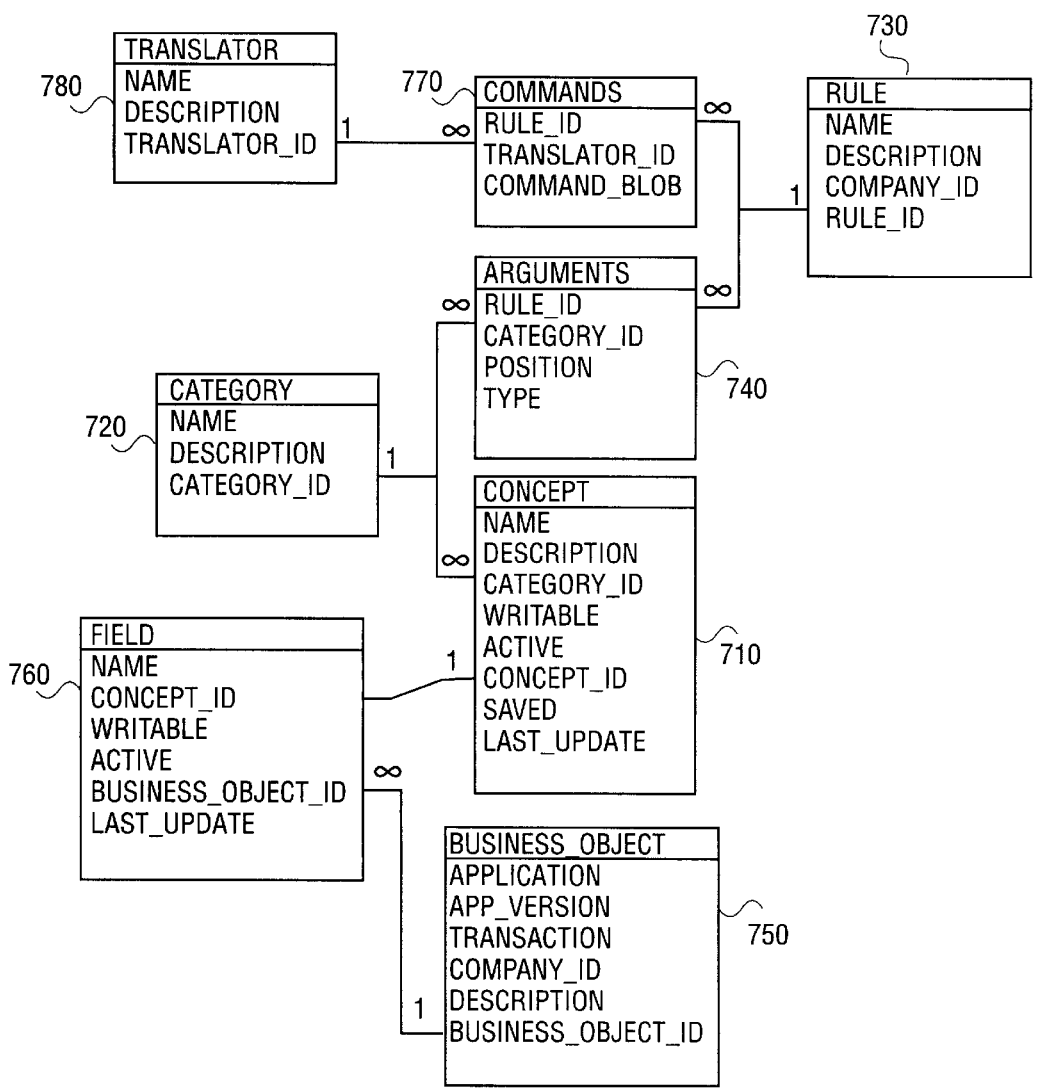
FIG. 7 is an embodiment of a data structure for a dictionary used to map a message in a first format to a second format.

FIG. 7 shows an embodiment of the data structure, or data tables, and the relationship between data structures, for the synonym and rule dictionaries. This data structure can store the synonym and rule data for all business objects. This data structure provides several advantages. One advantage is to allow efficient automatic mapping of disparate business objects. Another advantage is to make it possible to look up rules based on the types of data that the rules are intended to convert, rather than by name.

Concept data structure 710 stores all information necessary to represent a concept. Table 1 provides a description of the concept of data structure 710.

TABLE 1

| Name | Type | Notes |
| --- | --- | --- |
| NAME | CHARACTER (40) | Name of the concept |
| DESCRIPTION | CHARACTER (80) | Description of the concept |
| CATEGORY_ID | NUMBER | Foreign key reference to the category table |
| WRITABLE | NUMBER | Can the user change this concept? |
| SAVED | YES/NO | Have changes to this concept been saved to the database? |

TABLE 1-continued

| Name | Type | Notes |
| --- | --- | --- |
| DELETED | YES/NO | Has this concept been removed from the database? |
| COMPANY_ID | NUMBER | ID of the company that owns this concept. |
| CONCEPT_ID | NUMBER | Primary key (system-generated) |
| LAST_UPDATE | DATE | When was this concept last written to the database? |

Category data structure 720 stores basic information about a concept category. Table 2 provides a description of the category data structure 720.

TABLE 2

| Name | Type | Notes |
| --- | --- | --- |
| NAME | CHARACTER (40) | Name of this concept category. |
| DESCRIPTION | CHARACTER (80) | Description of this concept category. |
| CATEGORY_ID | NUMBER | Primary key (system-generated) |

Rule data structure 730 stores basic information for a rule, such as the ID of the company that owns it. Table 3 provides a description of the data structure 730.

TABLE 3

| Name | Type | Notes |
| --- | --- | --- |
| NAME | CHARACTER (40) | Name of this rule. |
| DESCRIPTION | CHARACTER (80) | Description of what the rule does |
| COMPANY_ID | NUMBER | ID of the company that owns the rule. |
| RULE_ID | NUMBER | Primary key (system-generated) |

Arguments data structure 740 stores this information necessary to pass arguments to rules. Table 4 shows a description of arguments data structure 740.

TABLE 4

| Name | Type | Notes |
| --- | --- | --- |
| RULE | NUMBER | Foreign key reference to the rule table |
| CATEGORY_ID | NUMBER | Foreign key reference to the category table |
| POSITION | NUMBER | Binding order of this argument |
| TYPE | NUMBER | Data type of this argument |

Business objects data structure 750 stores the information that is needed to identify a business object. Table 5 provides a description of business object data structure 750.

TABLE 5

| Name | Type | Notes |
| --- | --- | --- |
| APPLICATION | CHARACTER (16) | EDI, Idoc, XML, CBL, etc. |
| APP_VERSION | CHARACTER (16) | Application version, eg EDI 850 |
| TRANSACTION | CHARACTER (16) | Name of the business object, eg invoice |
| COMPANY_ID | NUMBER | ID of the company that owns the business |

TABLE 5-continued

| Name | Type | Notes |
| --- | --- | --- |
| | | object. |
| DESCRIPTION | CHARACTER (16) | Description of this business object |
| BUSINESS_OBJECT_ID | NUMBER | Primary key (system-generated) |

Field data structure 760 stores all of the synonyms for a given concept. Table 6 provides a description of field data structure 760.

TABLE 6

| Name | Type | Notes |
| --- | --- | --- |
| NAME | CHARACTER (256) | Fully-qualified name of the field |
| CONCEPT_ID | NUMBER | Foreign key to concept table |
| DELETED | YES/NO | Has this field been removed from a concept? |
| BUSINESS_OBJECT_ID | NUMBER | Foreign key to business_object table. |
| LAST_UPDATE | DATE | When was this field last saved to database? |

Command data structure 770 links a rule's signature information with the set of commands that implements the rule, described in Table 7.

TABLE 7

| Name | Type | Notes |
| --- | --- | --- |
| RULE_ID | NUMBER | Foreign key reference to the rule table |
| TRANSLATOR_ID | NUMBER | Identifier of the command translator (interpreter). |
| COMMAND_BLOB | LONG RAW | Binary representation of the rule's commands. |

Translation data structure 780 refers to the translators necessary to invoke the commands for a rule, as described in Table 8.

TABLE 8

| Name | Type | Notes |
| --- | --- | --- |
| NAME | CHARACTER (40) | Name of this command translator |
| DESCRIPTION | CHARACTER (80) | Description of this command translator |
| TRANSLATOR_ID | NUMBER | Primary key (system-generated) |

There are several advantages of the present invention over the prior art. For example, prior art methods do not automatically determine what rule is needed in order to perform a conversion. Prior solutions require human intervention during the mapping process to specify the rule that is necessary to implement a conversion. In contrast, the present invention limits actions required of users to adding new rules, which are available for subsequent mapping operations.

The present invention uses a knowledge base in order for the method to work. This knowledge base allows a user to leverage expertise in this knowledge base domain. Additional advantages of the present invention include providing maps that correctly perform the conversions between data fields; and providing greater convenience to users, because it is not necessary to re-enter a rule multiple times. In addition, rules are not bound to the fields of any format of a message. The same rule may be applied to different message formats. This makes the rules dictionary very memory space efficient.

A method and apparatus for automatically selecting rules is described. In the description, numerous details have been set forth. It will be apparent, however, to one skilled in the art, that the present invention may be practiced without these specific details. In other instances, well-known structures and devices are shown in block diagram form, rather than in detail, in order to avoid obscuring the present invention.

Some portions of the detailed descriptions are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The present invention also relates to apparatus for performing the operations herein. This apparatus may be specially constructed for the required purposes, or it may comprise a general purpose computer selectively activated or reconfigured by a computer program stored in the computer. Such a computer program may be stored in a computer readable storage medium, such as, but is not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, and each coupled to a computer system bus.

The algorithms and displays presented herein are not inherently related to any particular computer or other apparatus. Various general purpose systems may be used with programs in accordance with the teachings herein, or it may prove convenient to construct more specialized apparatus to perform the required method steps. The required structure for a variety of these systems will appear from the description below. In addition, the present invention is not described with reference to any particular programming language. It will be appreciated that a variety of programming languages may be used to implement the teachings of the invention as described herein.

In the foregoing specification, the invention has been described with reference to specific exemplary embodiments thereof. It will, however, be evident that various modifications and changes may be made thereto without departing from the broader spirit and scope of the invention as set for in the appended claims. The specification and drawings are, accordingly, to be regarded in an illustrative rather than a restrictive sense.

What is claimed is:

1. A computer-implemented method for converting a source message in a source format to a target message in a target format, the method comprising:

receiving input determining concepts for a plurality of business formats, wherein each concept has associated therewith a set of synonym fields from the plurality of business formats, the synonym fields being related through an abstract meaning;

building a synonym dictionary wherein each determined concept is mapped to its associated set of synonym fields;

associating a concept from the synonym dictionary with a target field in the target format; and determining a synonym field from the source format for the target field based on the associated concept and the synonym dictionary.

2. The method of claim 1, wherein associating the concept and determining the synonym field is performed for each target field in the target format.

3. The method of claim 1, wherein determining the synonym field comprises searching the synonym dictionary for synonym fields that are mapped to the concept associated with the target field and which match a source field in the source format.

4. The method of claim 3, further comprising constructing a mapping to map the target field to any matching source fields in the source format.

5. The method of claim 4, further comprising selecting a rule that specifies a conversion procedure for converting source data in a source field in the mapping to target data in a target field in the mapping.

6. The method of claim 5, wherein selecting the rule comprises determining a signature of the rule; and searching a rule dictionary for a rule that matches the signature.

7. The method of claim 6, further comprising first building the rule dictionary.

8. A method for converting a source message in a source format to a target message in a target format, the method comprising:

(a) receiving a target field from the target message;

(b) identifying a concept associated with the received target field in a synonym dictionary comprising concepts having associated therewith a set of synonym fields related through an abstract meaning;

(c) receiving the set of synonym fields associated with the identified concept;

(d) determining each synonym field in the set of synonym fields that matches a source field from the source message; and (e) mapping the received target field to each matched source field.

9. The method of claim 8, further comprising performing steps (a) to (e) for each target field in the target message.

10. The method of claim 9, further comprising first determining concepts for a plurality of business formats, wherein each concept has associated therewith a set of synonym fields from the plurality of business formats, and wherein the synonym fields are related through an abstract meaning; and building a synonym dictionary wherein each determined concept is mapped to its associated set of synonym fields.

11. The method of claim 10, further comprising selecting a rule that specifies a conversion procedure for converting source data in source fields in the mapping to target data in target fields in the mapping.

12. A method for converting a source message in a source format to a target message in a target format, the method comprising:

determining a mapping that maps source and target fields in the source and target messages, respectively, based on an abstract meaning of the source and target fields;

determining a signature of a rule that specifies a conversion procedure for converting data from the source fields in the mapping to data in the target fields in the mapping; and selecting a rule from a rules dictionary that matches the signature of the rule.

13. The method of claim 12, further comprising prompting a user to create a new rule if there is no rule in the rules dictionary that matches the signature, wherein selecting the rule then comprises selecting the new rule.

14. The method of claim 12, wherein selecting the rule comprises, in the case of the rules dictionary having a plurality of rules that match the signature, displaying the plurality of rules to a user, and receiving a user's selection of a rule from the plurality of rules.

15. The method of claim 12, further comprising converting data from the source fields to data in the target fields based on the mapping and the selected rule.

16. A system for converting a source message in a source format to a target message in a target format, the system comprising:

a processor;

a memory coupled to the processor, the memory storing instructions which when executed by the processor, cause the system to perform a method comprising:

receiving input determining concepts for a plurality of business formats, wherein each concept has associated therewith a set of synonym fields from the plurality of business formats, the synonym fields being related through an abstract meaning;

building a synonym dictionary wherein each determined concept is mapped to its associated set of synonym fields;

associating a concept from the synonym dictionary with a target field in the target format; and determining a synonym field from the source format for the target field based on the associated concept and the synonym dictionary.

17. A system for converting a source message in a source format to a target message in a target format, the system comprising:
- a processor;
- a memory coupled to the processor, the memory storing instructions which when executed by the processor cause the system to perform a method comprising:
  - (a) receiving a target field from the target message;
  - (b) identifying a concept associated with the received target field in a synonym dictionary comprising concepts having associated therewith a set of synonym fields related through an abstract meaning;
  - (c) receiving the set of synonym fields associated with the identified concept;
  - (d) determining each synonym field in the set of synonym fields that matches a source field from the source message; and
  - (e) mapping the received target field to each matched source field.

18. A system for converting a source message in a source format to a target message in a target format, the system comprising:
- a processor;
- a memory coupled to the processor, the memory storing instructions which when executed by the processor cause the system to perform a method comprising:
  - determining a mapping that maps source and target fields in the source and target messages, respectively, based on an abstract meaning of the source and target fields;
  - determining a signature of a rule that specifies a conversion procedure for converting data from the source fields in the mapping to data in the target fields in the mapping; and
  - selecting a rule from a rules dictionary that matches the signature of the rule.

19. A computer-readable medium having stored thereon a sequence of instructions which when executed by a processor, cause the processor to perform a method for converting a source message in a source format to a target message in a target format, the method comprising:
- receiving input determining concepts for a plurality of business formats, wherein each concept has associated therewith a set of synonym fields from the plurality of business formats, the synonym fields being related through an abstract meaning;
- building a synonym dictionary wherein each determined concept is mapped to its associated set of synonym fields;
- associating a concept from the synonym dictionary with a target field in the target format; and
- determining a synonym field from the source format for the target field based on the associated concept and the synonym dictionary.

20. A computer-readable medium having stored thereon a sequence of instructions which when executed by a processor cause the processor to perform a method for converting a source message in a source format to a target message in a target format, the method comprising:
- (a) receiving a target field from the target message;
- (b) identifying a concept associated with the received target field in a synonym dictionary comprising concepts having associated therewith a set of synonym fields related through an abstract meaning;
- (c) receiving the set of synonym fields associated with the identified concept;
- (d) determining each synonym field in the set of synonym fields that matches a source field from the source message; and
- (e) mapping the received target field to each matched source field.

21. A computer readable medium having stored thereon a sequence of instructions which when executed by a processor cause the processor to perform a method for converting a source message in a source format to a target message in a target format, the method comprising:
- determining a mapping that maps source and target fields in the source and target messages, respectively, based on an abstract meaning of the source and target fields;
- determining a signature of a rule that specifies a conversion procedure for converting data from the source fields in the mapping to data in the target fields in the mapping; and
- selecting a rule from a rules dictionary that matches the signature of the rule.

* * * * *